US010779141B2

(12) United States Patent
Conan et al.

(10) Patent No.: US 10,779,141 B2
(45) Date of Patent: Sep. 15, 2020

(54) DEVICE AND METHOD FOR A GATEWAY FOR THE CONSISTENT UPDATING OF THE SERVICES OF A HOME NETWORK (71) Applicant: Orange, Paris (FR)

(72) Inventors: Martin Conan, Cesson Sevigne (FR); Jean-Bernard Leduby, Erquy (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/314,315

(22) PCT Filed: May 7, 2015

(86) PCT No.: PCT/FR2015/051215
§ 371 (c)(1),
(2) Date: Nov. 28, 2016

(87) PCT Pub. No.: WO2015/181461
PCT Pub. Date: Dec. 3, 2015

(65) Prior Publication Data
US 2017/0208418 A1 Jul. 20, 2017

(30) Foreign Application Priority Data
May 26, 2014 (FR) ...................... 14 54726

(51) Int. Cl.
H04W 4/50 (2018.01)
H04W 4/60 (2018.01)
(Continued)

(52) U.S. Cl.
CPC ............... H04W 4/50 (2018.02); G06F 8/60 (2013.01); H04L 5/0035 (2013.01); H04L 67/34 (2013.01);
(Continued)

(58) Field of Classification Search
CPC ................... H04W 4/001; H04W 52/0209; H04L 5/0035; H04L 12/2854
(Continued)

(56) References Cited

U.S. PATENT DOCUMENTS

2003/0143952 A1 7/2003 Haller et al.
2005/0021714 A1* 1/2005 Yook .................. H04L 12/2805
709/223
(Continued)

FOREIGN PATENT DOCUMENTS

EP 1574951 A1 9/2005

OTHER PUBLICATIONS

English translation of the International Preliminary Report on Patentability dated Jan. 5, 2016 for corresponding International Application No. PCT/FR2015/051215, filed May 7, 2015.
(Continued)

Primary Examiner — Shahriar Behnamian
(74) Attorney, Agent, or Firm — David D. Brush; Westman, Champlin & Koehler, P.A.

(57) ABSTRACT

A method is provided for controlling the updating of a co-operative service in a local network. The service includes at least two software components, at least one first software component on a first terminal referred to as a "mobile" terminal and at least one second software component on a second terminal referred to as a "receiver" terminal. The mobile terminal is connected to a network other than the local network, and referred to as the "mobile" network. The receiver terminal is suitable for communicating with the mobile terminal. The method includes: receiving on the mobile terminal an update of the service from the mobile network; and transmitting the update of the second software component to the receiver terminal.

11 Claims, 2 Drawing Sheets (51) Int. Cl.
*H04L 29/08* (2006.01)
*G06F 8/60* (2018.01)
*H04L 5/00* (2006.01)
*H04W 52/02* (2009.01)
*G06F 8/65* (2018.01)
*H04L 12/28* (2006.01)

(52) U.S. Cl.
CPC ......... *H04W 4/60* (2018.02); *H04W 52/0209* (2013.01); *G06F 8/65* (2013.01); *H04L 12/2854* (2013.01); *Y02D 10/42* (2018.01); *Y02D 70/1242* (2018.01); *Y02D 70/1262* (2018.01); *Y02D 70/142* (2018.01); *Y02D 70/144* (2018.01); *Y02D 70/162* (2018.01); *Y02D 70/168* (2018.01); *Y02D 70/22* (2018.01); *Y02D 70/26* (2018.01)

(58) Field of Classification Search
USPC ....................................................... 455/419
See application file for complete search history.

(56) References Cited

U.S. PATENT DOCUMENTS

2007/0250458 A1* 10/2007 Watanabe ............. G06Q 99/00
705/500
2008/0160983 A1* 7/2008 Poplett ..................... G06F 8/61
455/419
2010/0115576 A1 5/2010 Hale et al.
2012/0170521 A1* 7/2012 Vogedes ................ H04W 76/15
370/329
2012/0209951 A1* 8/2012 Enns ................. H04L 29/08729
709/217
2016/0050621 A1* 2/2016 Enomoto .......... H04W 52/0209
370/311

OTHER PUBLICATIONS

International Search Report dated Jul. 28, 2015 for corresponding International Application No. PCT/FR2015/051215, filed May 7, 2015.
Anonymous, "Pebble", Aug. 21, 2013 (Aug. 21, 2013), XP055157040.
Anonymous, "Pebblie—Application Android sur Google Play", Apr. 18, 2014 (Apr. 18, 2014), XP055157230.
Written Opinion of the International Searching Authority dated Jul. 28, 2015 for corresponding International Application No. PCT/FR2015/051215, filed May 7, 2015.
International Preliminary Report on Patentability dated Jan. 5, 2016 for corresponding International Application No. PCT/FR2015/051215, filed May 7, 2015.

* cited by examiner

DEVICE AND METHOD FOR A GATEWAY FOR THE CONSISTENT UPDATING OF THE SERVICES OF A HOME NETWORK

CROSS-REFERENCE TO RELATED APPLICATIONS

This Application is a Section 371 National Stage Application of International Application No. PCT/FR2015/051215, filed May 7, 2015, which is incorporated by reference in its entirety and published as WO 2015/181461 on Dec. 3, 2015, not in English.

TECHNICAL FIELD

The invention applies to communication between two terminals, and in particular to updating one terminal from another terminal.

The invention applies most particularly to updating a terminal via a mobile terminal.

The term "mobile terminal" is used to mean any type of terminal that can be moved while remaining connected to a mobile communications network. By way of example, it may be a mobile telephone, or indeed a computer, an electronic tablet, etc.

STATE OF THE ART

A local network, also referred to as a home network, is a computer network that connects together, with or without wires, the terminals in a home (i.e. computers, printer peripherals, playback peripherals, storage peripherals, etc.), that are suitable for communicating with one another. A home network generally includes router equipment, also commonly referred to as a home gateway or as a service gateway, and acting as an intermediate element for redirecting or "routing" data packets between the various terminals and the networks that are connected thereto. Such a home network often connects together various terminals by using WiFi technology. The term WiFi (short for "wireless fidelity") is used herein to cover various wireless transmission technologies that enable wireless computer networks to be set up on the basis of standards in the IEEE 802.11 family.

Consequently, the term "terminal device" or more simply "terminal" is used herein to mean any device suitable for connecting to the service gateway, such as a computer, a television set, a personal computer, an electronic tablet, a smartphone, a personal digital assistant (PDA), or more generally any device suitable for communicating with or without wires with the service gateway or with another terminal, and in particular a mobile device.

In the context of a home network, a user can execute a given service on one or more given terminals, each having its own characteristics. A service can be properly rendered on some particular terminal only if all of the software components needed for proper operation are indeed deployed, i.e. installed and activated for that type of terminal. It is particularly important for the software component to be constantly updated, i.e. for them to correspond to the latest version from the service supplier. Otherwise, incompatibility between the various versions of the various components of the service can lead to malfunctioning.

Solutions exist for updating such a service on a given terminal: for example, a mobile applications store ("App Store" or "Android store") enables the user to download a given service for a mobile terminal. In another example, the specifications of the international broadband forum, and in particular its specification TR069 ("CPE WAN management protocol"), provide solutions for managing communication between terminal equipment of a local network and an associated automatic configuration server in a network belonging to an operator, thus enabling a given terminal to be remotely administered (for configuration, diagnosis, updating, maintenance, etc.).

Nevertheless, such a service can require co-operation between a plurality of pieces of equipment in the local network. For example, in order to play back a multimedia content on a digital tablet from a personal computer (PC) or from a mobile telephone, it is necessary to have one component of the service on the tablet and another component of the service on the PC or the mobile telephone. In another example, in order to use a television set to view digital photographs that are stored on a smartphone, i.e. with the two terminals co-operating with each other, it is also necessary to have a respective software component in each of the two terminals. Under such circumstances, the service can be seen as a set of software components or programs that are associated with a set of hardware components. In general manner, the term "co-operative service" is used below to refer to such a multi-component service that is shared among a plurality of terminals. Each component may itself comprise some number of sub-components (programs, configuration files, settings files, etc.).

The updating of such a service involves replacing or modifying some or all of the various sub-components of the components of the service so as to obtain a given version of the service for all of the components or sub-components.

The above-mentioned solutions for updating, whether they involve a mobile applications store or the TR069 standard, assume that the terminal is connected to the Internet wide area network (WAN). Unfortunately, it may happen that a terminal is not connected to the wide area network at a given instant. And even assuming that it is connected, the network may be of poor quality and the time required for updating may not be under control. An update coming from a server on the WAN may also be dangerous since it is not personalized and might be subject to intrusion. Furthermore, one of the components of the co-operative service may be updated before the others, thereby leading to a malfunction or to poor operation of the co-operative service.

The invention provides a solution that does not present the drawbacks of the state of the art.

THE INVENTION

To this end, in a functional aspect, the invention provides a method of controlling the updating of a co-operative service in a local network, said service including at least two software components, at least one first software component on a first terminal referred to as a "mobile" terminal connected to a network other that the local network, referred to as a "mobile" network, and at least one second software component on a second terminal referred to as a "receiver" terminal suitable for communicating with the mobile terminal, said method being characterized in that it comprises the steps of:
   receiving on the mobile terminal, an update of the service from the mobile network; and
   transmitting the update of the second software component to the receiver terminal.

The invention thus enables a service for a terminal of the local network to be updated from the mobile terminal. The service may be co-operative, for example distributed between a mobile appliance and some other appliance of the network, without the terminal necessarily being connected to the wide area network (WAN) since it receives the update of its component of the service automatically since it is "pushed" from the mobile terminal to the receiver terminal. In this example, the update corresponds to replacing all or part of the existing component. For example, the component may comprise a set of sub-components in the form of software and files (configuration files, settings files, graphics interface files, interfaces with a hardware component, etc.). Updating may consist in replacing one or more of these sub-components on the receiver terminal. The invention thus advantageously controls the terminals that need to be updated for the service independently of the wide area network (WAN) and of the applications servers on that network. It presents the advantage of making it simple to update terminals that are not connected to the Internet wide area network (e.g. terminals that manage things in the home, such as electrical thermostats, refrigerators, etc.), but that can communicate with the mobile terminal (e.g. a thermostat can communicate with a tablet or a smartphone belonging to an occupant of the home). This also limits to a considerable extent any risk of intrusion on such terminals by means of an inappropriate remote command coming from outside the local network. Furthermore, when the WAN is of low performance (as may be the case in certain countries or in certain regions, or because the user only has a low grade subscription, e.g. in a holiday home), the method is advantageous since the service is updated in an "asynchronous" manner, i.e. updating is not correlated with downloading from the WAN, and the time required for downloading is thus independent of the quality of the network.

The mobile terminal is preferably connected to a mobile network that is indeed mobile, but it is possible as an alternative to envisage it being connected to a network of any other type, such as a business network, another local network, etc.

In a particular implementation of the invention, a method as described above is further characterized in that the update of the service includes a sub-component for controlling the updating of the service.

Advantageously, in this implementation, the updating program is transmitted to the mobile terminal at the same time as the update of the service. There is thus no need to install the updating program in advance on the mobile terminal. This makes available the most recent updating program for the service. Correspondingly, this control program may be uninstalled at the same time as the service.

In a second particular implementation of the invention, which may be performed as an alternative to the preceding implementation, the above-described method is further characterized in that it includes the steps of:
  acquiring at least information associated with the version of the software component on the receiver terminal;
  analyzing at least the acquired information associated with the version of the software component; and
  depending on the results of the analysis, deciding whether or not to update the component.

This implementation of the invention enables only obsolete components of the service to be updated (i.e. components or sub-components for which there exists a version that is more recent). It also provides the advantage of taking control over the version numbers of the various components of the service and thereby ensuring that the various components on the various terminals of a co-operative service are compatible. In this way, only those components that do not have the right version number are updated, which avoids systemically pushing updates to terminals that do not need them.

In a third particular implementation of the invention, which may be performed as an alternative or together with the above implementations, a method as described above is further characterized in that both terminals are connected to the local network and communication between the two terminals is set up via said local network.

This implementation of the invention provides the advantage of dialog being simple between terminals in the same local network. Such a local network is generally controlled by a service gateway. The two terminals, the mobile terminal and the receiver terminal, are then conventionally connected to the service gateway in the so-called "infrastructure" mode, either via a wired connection or via a wireless connection of the WiFi type. The role of the gateway may also be performed by the mobile terminal itself, if it is operating in the so-called "tethering" mode in which the mobile terminal acts as the access point to the local network and replaces the service gateway.

In a fourth particular implementation of the invention, which may be implemented as an alternative to or together with the above implementations, a method as described above is also characterized in that communication between the two terminals is set up in point-to-point mode and in that it includes a prior step of opening point-to-point communication.

This implementation of the invention provides the advantage of increased security since with a point-to-point connection, only the two terminals involved (the mobile terminal and its receiver terminal) manipulate the data of the update, without any data transiting over the local network. By way of example, this may be done using a so-called "ad hoc" WiFi mode between the two terminals both having a WiFi function, which mode is also known as "WiFi-direct" (WFD), and as an alternative to the above-described "infrastructure" mode. Furthermore, in this point-to-point connection mode, the receiver terminals are not necessarily connected to the local network, which can be advantageous for reasons of data security, electricity consumption, etc. Furthermore, they are inaccessible from the WAN and they are not sensitive to its quality, thereby reinforcing the advantage of the asynchronous nature of updating when the WAN is of poor performance, given that the point-to-point connection is completely independent.

In a variant, a method as described above is further characterized in that communication between the two terminals is set up over a low power consumption link.

This variant implementation of the invention provides the advantage of being able to address terminals that do not have a WiFi function and also makes it possible to minimize energy consumption during exchanges. A terminal in a home, such as a thermostat for example, may have a Bluetooth function, for example. Bluetooth technology is short-range radio technology for simplifying connections between electronic appliances, as developed by the "Bluetooth SIG" association. It is particularly widespread and useful for setting up a point-to-point connection between appliances that are close together. It is very simple to use, it consumes little energy, and it is nevertheless secure. Furthermore, it is independent of the WiFi protocol usually used for the connection to the local network. Alternatively, other technologies could be envisaged in the context of the invention, e.g. the Zigbee protocol or the Z-Wave protocol, which are standardized protocols that also enable peripherals to communicate over a radio link, at low power, or indeed the DECT standard (another wireless communication standard), etc. Most of these standards also possess a "very low power consumption" version and are therefore most advantageous in the context of the invention.

In a hardware aspect, the invention also provides a device for controlling the updating of a co-operative service in a local network, said service including at least two software components, at least one first software component on a first terminal referred to as a "mobile" terminal connected to a network other that the local network, referred to as a "mobile" network, and at least one second software component on a second terminal referred to as a "receiver" terminal suitable for communicating with the mobile terminal, the device being characterized in that it comprises:
   a receive module on the mobile terminal for receiving an update of the service from the mobile network; and
   a transmit module for transmitting to the receive module the update of the second software component.

The term "module" may correspond equally well to a software component or to a hardware component or to a set of software components or to a set of hardware components, and a software component may itself correspond to one or more computer programs or sub-programs, or more generally to any element of a program suitable for performing a function or a set of functions as described for the modules in question. In the same manner, a hardware component corresponds to any element of a hardware assembly suitable for performing a function or a set of functions for the module in question (integrated circuit, smart card, memory card, etc.).

In another hardware aspect, the invention also provides a mobile terminal including a device as described above for controlling updating.

In another functional aspect, the invention provides a method of updating a co-operative service in a local network, said service including at least two software components, at least one first software component on a first terminal referred to as a "mobile" terminal connected to a network other that the local network, referred to as a "mobile" network, and at least one second software component on a second terminal referred to as a "receiver" terminal suitable for communicating with the mobile terminal, said method being characterized in that it comprises the steps of:
   the receiver terminal receiving an update of the second software component from the mobile terminal; and
   the receiver terminal updating the second software component.

In a hardware aspect, the invention also provides a device for updating a co-operative service in a local network, said service including at least two software components, at least one first software component on a first terminal referred to as a "mobile" terminal connected to a network other that the local network, referred to as a "mobile" network, and at least one second software component on a second terminal referred to as a "receiver" terminal suitable for communicating with the mobile terminal, said device being characterized in that it comprises:
   a receive module on the receiver terminal for receiving an update of the second software component from the mobile terminal; and
   an updating module on the receiver terminal for updating the second software component.

In another hardware aspect, the invention also provides an electronic key including an updating device as described above.

In another hardware aspect, the invention also provides a home terminal that is not connectable to the wide area network and including an updating device as described above.

In another hardware aspect, the invention also provides a system comprising a mobile terminal and at least one receiver terminal as described above. in another hardware aspect, the invention also provides a computer program suitable for being implemented for the method of controlling the updating of a content as defined above, the program comprising code instructions that, when the program is executed by a processor, perform the steps of the method of controlling updating.

In another hardware aspect, the invention also provides a computer program suitable for being implemented for the method of updating a content as defined above, the program comprising code instructions that, when the program is executed by a processor, perform the steps of the updating method.

In yet another hardware aspect, the invention relates to a processor-readable data medium storing a program including program code instructions for executing steps of any of the above-defined methods.

These devices, computer programs, and data media, present characteristics and advantages analogous to those described above with reference to the method of controlling updating.

The invention can be better understood on reading the following description given by way of example and made with reference to the accompanying drawings.

DETAILED DESCRIPTION OF ILLUSTRATIVE EMBODIMENTS

Figure 1:
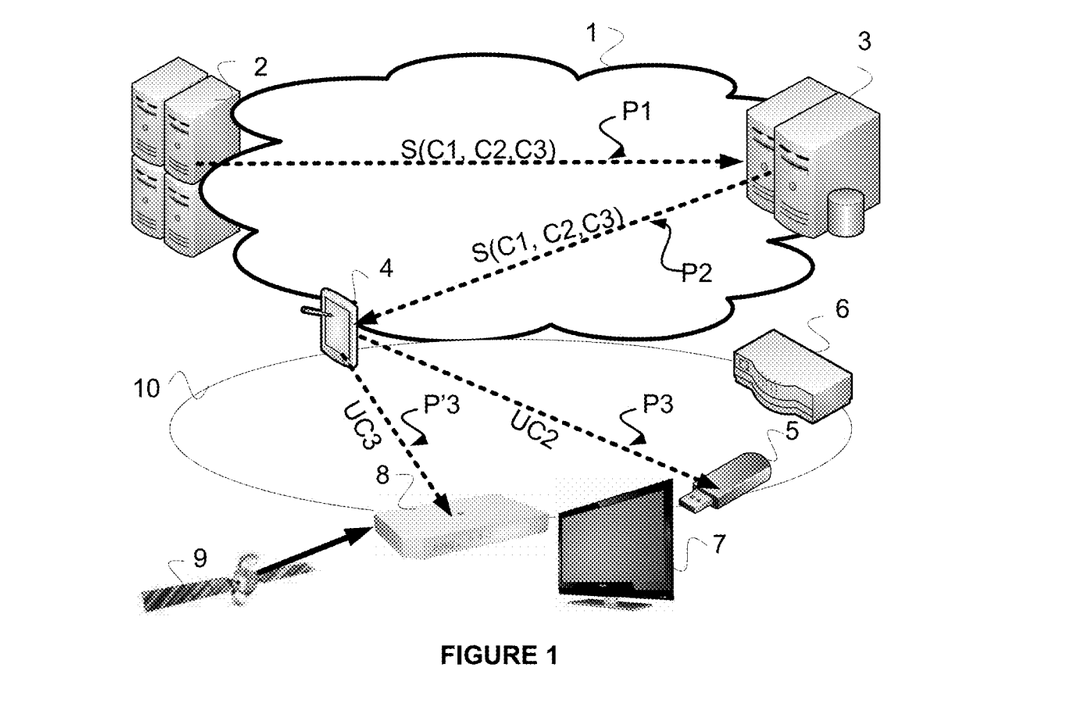
FIG. 1 shows an embodiment of the invention.

FIG. 1 shows an embodiment of the invention. The local network (10) comprises a mobile terminal (4), an extension terminal (5) connected to the television set (7) of a user, a digital decoder type terminal (8) known as a set-top-box (STB), and a service gateway (6). The context of a home local network is described by way of example and can easily be transposed to the context of a business network.

The network (10) is a wireless (WiFi) local network. The terminal devices 4 and 5 are suitable for setting up connections with the service gateway (6), which is also connected to the Internet wide area network (WAN, not shown) via a broadband connection. By way of example, the network (10) is an Internet protocol (IP) local network (where the Internet protocol is the basic protocol for Internet type networks, and by extension is used to designate the network itself) and the broadband connection is of the asymmetric digital subscriber line (ADSL) type.

The mobile terminal (4) is also connected to a mobile network (1) containing an application server (3), which serves in particular to host services that are for making available to terminals of the local network (10). These applications, or services, may be co-operative, i.e. they may relate to a plurality of terminals of the local network. They are placed on the application server (3) by a server (2), e.g. belonging to a service and/or network operator, and they correspond to co-operative services of that operator, and suitable for being made available to terminals of the local network, e.g. a service for transferring digital content received on the mobile terminal (4) to the television set (7).

In this example, the service gateway (6) is a home gateway that routes data in the local network (10) and between the local network (10) and the wide area network (WAN). By way of example, the home gateway (6) may be router equipment known under the trade name Livebox©. It includes a WiFi communication function, or access point (AP), that enables it to communicate with the terminals of the wireless network. This access point includes a bidirectional radio module for transmitting or receiving signals in the local network.

In this example, the mobile terminal (4) is connectable to a mobile network (1). Alternatively, it may be connected to any other network hosting an applications server, e.g. a business local network. By way of example, the mobile terminal (4) may be a smartphone or a digital tablet, or indeed it may be a laptop computer. The mobile network (1) is a cellular radio communications mobile network, e.g. of the third generation (3G, in compliance with the universal mobile telecommunications system (UMTS) standard that is well known to the person skilled in the art) or indeed of the fourth generation (4G, e.g. in compliance with the long term evolution (LTE) standard), etc. Where appropriate, the mobile terminal (4) may also itself act as a service gateway if it is put into a so-called "tethering" mode, in which it acts as a router and gives other terminals of the local network access to the WAN.

In this example, the two receiver terminals suitable for entering into communication with the mobile terminal (4) are thus firstly an extension device (5) and secondly the STB (8). Below, the term "receiver terminal" is used to designate any terminal suitable for connecting to the gateway (6) or to the mobile terminal (4), such as a computer or a device of the television (TV), personal computer (PC), smartphone, personal digital assistant (PDA), or set-top-box (STB) type, or more generally any device suitable for communicating with the gateway in wired or wireless manner in the context of the local network or directly with the mobile terminal (4) in point-to-point manner.

In this example, a first co-operative service provided by a network and/or services operator (2) is of the mobile type and relates to mobile applications in which a portion of the application is transferred to another terminal of the network: playing back or displaying multimedia content, etc. Such a co-operative service is thus executed in part on the mobile terminal (4) and in part on the terminal (5) associated with the television set (7). The extension peripheral (5) in this example is connected to an HDMI video port of the user's television set (7) and is in the form of an electronic key or "dongle". Below, it is referred to as the "extension key". The user selects a content, e.g. a video, by using the mobile terminal (4) (smartphone, tablet, computer, etc.) that is connected to the mobile network. The multimedia content for viewing on the TV (7) is then downloaded by the extension key, e.g. in a streaming download mode (i.e. progressively) over the wide area Internet (WAN) and is played back on the television set. In this example, the extension key is itself connected to the wide area network via the service gateway (6). This offsetting of content presents several advantages since the mobile terminal can be relieved of a task that consumes a large amount of resources (decoding, video display, etc.), thereby enabling it to perform other functions for the user at the same time (e.g. viewing email, processing a short message (SMS), etc.), and the mobile can continue to act as a remote control for basic functions associated with the content, such as for example stopping playback ("pause" or "stop"), controlling volume, etc. This first example of a co-operative service thus has two components: one on the mobile terminal for selecting and controlling programs and for updating (C1), and another on the extension key (C2) for downloading multimedia data and making it available to the television set (7).

Another way in which the user can watch television on the TV (7) is to use the digital decoder (STB, 8) that is associated therewith and that receives, via a satellite network (9), broadcast digital television of the digital video broadcast (DVB) type, i.e. complying with a set of digital television standards issued by the European DVB consortium. In that standard, various broadcast programs are distributed in transport streams that are received by the digital decoders (8) of users via appropriate reception equipment (antennas, cables, etc.), and the various programs making them up are made available for a user, in particular for viewing on a television set (7). In this example, the decoder (8) is a satellite decoder (9). It is not connected to the Internet wide area network (WAN), nor is it connected to the local network (10). It does not have a WiFi module. In contrast, it does have a Bluetooth interface (BT) that enables it to communicate directly with the mobile terminal (4). The service to be rendered is as follows: it may happen that the software version of the STB is not up to date and does not enable content to be received and viewed on the TV. It is in this context that connecting the STB to the mobile terminal (4) via the Bluetooth connection makes it possible for it to receive the update that it needs to operate. This second example of a service thus likewise comprises two components: one component on the mobile terminal for performing the updating (C1) and a second component on the STE (C3) for receiving multimedia data and making it available to the television set (7).

In both of these examples of services, the overall operation of the system is as follows:

in a first step, the service and/or network operator (2) prepares the co-operative service. The service is in the form of a set of software components that, by communicating with one another, serve to provide the overall service (in this example the set of software components that make viewing possible on the television set). A first component (C1) is for the mobile terminal itself.

With the extension service, the first component C1 has two sub-components: a first sub-component corresponding to the updating program itself, if not already present on the mobile terminal, and a second sub-component corresponding to updating the portion of the service that is on the mobile terminal (graphics interface of the application, etc.). A second component (C2) is for the extension key: it comprises in particular a low level software application (firmware) for the key.

For the service for viewing programs via the satellite STB, the first component C1 comprises a sub-component corresponding to the updating program, which may possibly already be present on the mobile terminal. A second component (C3) is for the STB: by way of example, it comprises a high level software application (graphics interface, decoding, etc.) or a low level application (firmware updating, etc.) for the STB.

In a second step, referenced P1 in the figure, the service S (C1, C2, C3) (the notation covers both services together for reasons of simplicity, but naturally the two services could be completely decorrelated) is made available on an applications server (3) of the mobile network ("Apple Store", etc.).

In a third step, referenced P2, the mobile terminal (4) downloads the application (S) from the server (3).

A communication channel is set up between the mobile terminal (4) and the receiver terminal (5, 8). This communication may be of several types:

This may conventionally be done by the local network. It should be observed in this example that both terminals (4, 5) are conventionally connected in a so-called "infrastructure" mode to the service gateway (6) by a prior pairing process known to the person skilled in the art, during which the following settings in particular are input: the service set identifier (SSID) and the wired equivalent privacy (WEP) key.

The communication may alternatively take place in the so-called "ad hoc" mode between the two terminals (4, 5) that have a WiFi function. In ad hoc mode, also known as "WiFi-direct", and in contrast to the above-described "infrastructure" mode, the wireless devices connect to each other so as to set up point-to-point (or "peer-to-peer") links, i.e. a network in which each device acts both as a client and as a server, or access point.

The terminals in question need not have a WiFi function. This applies to the STB terminal (8) in this example, which only has a Bluetooth function. Under such circumstances, communication is set up between the two terminals in point-to-point Bluetooth mode.

Alternatively, communication may be set up by any means available to the person skilled in the art, in particular by any radio communication protocol that enables two terminals to communicate with each other: the Zigbee or Z-Wave protocols (which enable peripherals to communicate at low power over a radio link), the DECT protocol (another wireless communications standard), etc. Among these protocols, some advantageously provide low power consumption: the DECT ultra-low energy (DECT ULE) standard, a version of the Bluetooth standard that consumes even less energy (known as Bluetooth low energy (BLE) for using power that is low compared with standard Bluetooth applications), etc.

During communication, the mobile terminal transmits to the extension key the update (UC2) of the component C2 that it needs in order to update the service, or to the STB the update (UC3) of the component C3 that it needs. These steps of transmitting the update are referenced P3 and P'3 respectively. It should be observed that the update (UC2, UC3) may possibly be equal to the component itself (C2, C3).

The extension terminal (or the STB) is updated either by replacing the old component C2 (or C3), e.g. firmware, with the new component, or else by executing an update for the component C2 (or C3) in which certain sub-components are replaced (e.g. by replacing fractions of the firmware), and then the co-operative service can take place as described above.

Figure 2:
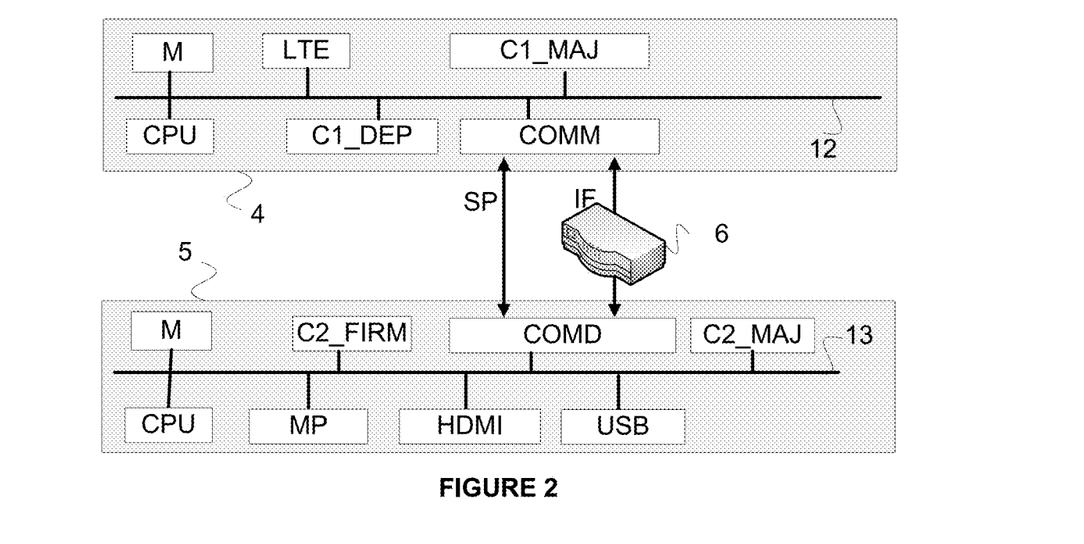
FIG. 2 shows a hardware architecture for an updating controller device connected to an updater device in an embodiment of the invention.

FIG. 2 shows a hardware architecture for an updating controller device on a mobile terminal connected to an updater device on a terminal for updating in an embodiment of the invention.

Conventionally, the mobile device of the mobile terminal (4) comprises memories M arranged around a central processor unit (CPU). The memories may be of the read only memory (ROM) or random access memory (RAM) type and they may be removable or soldered, etc. The device communicates with the local network (1) via the communication module (COMM) that enables it to connect with or without wires (via an Ethernet cable or via a WiFi type radio channel) to the service gateway (6) in infrastructure mode (IF). An ad hoc communication channel (SP) could also be used in point-to-point mode between the two terminals (4) and (5). This channel may be of the WiFi (direct), Bluetooth, Zigbee, etc., type.

The mobile device also has a mobile radio module (e.g. UMTS or LTE) enabling it to dialog with the mobile network (1).

It also includes the application C1_DEP for controlling the extension, in particular for communication with the extension device (5), for selecting content (e.g. video content) and transmitting an identifier of the content to the extension device, for controlling playback of the content, etc.

It also has a program C1_MAJ for controlling updating of the components of the service, serving in particular to interrogate the terminals for updating about their version numbers and deciding whether or not to push updates, and then receive acknowledgments, if any, from the receiving terminals.

A portion of the memory M is connected to the WiFi access point and, amongst other things, it stores the identification parameters of the home gateways and of the terminals of the mobile network that the mobile device can access, and also the complete service S downloaded from the application server with the components C1 (for the mobile terminal), C2 (for the key), and C3 (for the STB).

All of these modules communicate internally over a bus (12).

The extension device (5) on the extension key also has memories M arranged around a processor CPU. The memories may be of ROM, RAM, or other types. Amongst other things, a portion of the memory M stores the identification parameters of home gateways that can be accessed by the extension device. It communicates with the local network (1) and with the mobile device (4) via the communication module (COMD) that enables it in particular to make a wireless connection (WiFi) with the service gateway (6) using an infrastructure (IF) connection or directly with the mobile device using a service provider (SP) connection in point-to-point mode (WiFi direct or Bluetooth). It also includes:

An application (C2_MAJ) for updating the device. This module is capable in particular of communicating with the mobile terminal via the local network and/or via a point-to-point connection, of receiving the updates, of executing them, and of restarting the terminal so that the updates take effect.

A media player (MP) module capable of playing back (receiving, decoding, preparing) streams downloaded progressively from the wide area network (WAN) and deliver them to the playback device (TV); amongst other things, the media player includes a set of decoders (audio, video, etc.) suitable for decoding multimedia contents, and a communication interface with the mobile device suitable for interpreting orders coming from the device (pause, rewind, volume control, etc.).

An interface module with the playback device (HDMI) capable of interfacing in physical and logical manner with the television set in order to transmit the decoded content, exchange basic commands coming from the remote control of the television set, etc.

A universal serial bus (USB) type serial interface module serving in particular to power it.

These last two modules are controlled, amongst other things, by the firmware of the extension key, i.e. by the set of low level software programs that serve to control the hardware resources of the key. It is referenced C2_FIRM; in this example this is the component for updating.

All of these modules communicate internally over a bus (13).

Figure 3:
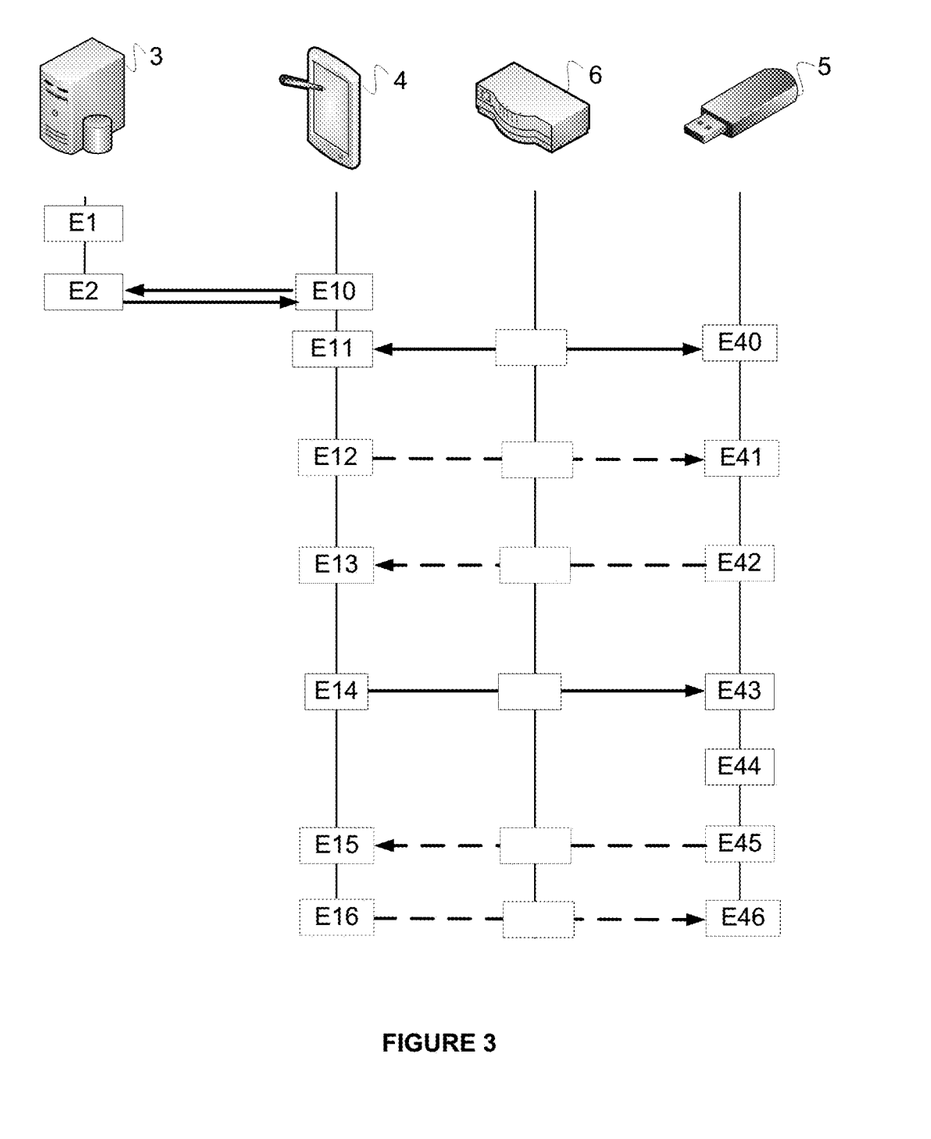
FIG. 3 is a timing chart showing exchanges between an updating controller device and an updater device in an implementation of the invention.

FIG. 3 is a timing chart showing exchanges between an extension key or device (5) connected to a playback device (TV) that is not shown, and a mobile device (4) in an implementation of the invention.

In a prior step that is not shown, a user of a local network (referred to below as "the user") connects the extension key to the HDMI port of the TV (7). In this example, it is assumed that the extension key is not up to date: its firmware version (C2_FIRM) is obsolete.

During a step E1, the mobile applications server (3) recovers the service S (C1, C2, C3) from the network and/or service operator.

During a step E10, the mobile terminal (4) downloads the service from the mobile applications server (3, store) via the mobile network. In this example, the service S includes:

The extension controlling sub-component (C1_DEP) for extending content playback for the mobile terminal, or the update for this sub-component. By way of example, it may be an electronic program guide (EPG) for selecting various TV channels and/or digital contents (films, music, etc.) stored on the mobile terminal.

The sub-component (C1_MAJ) for controlling updating of the service if it is not already installed on the mobile terminal.

The sub-component (C2_FIRM) containing the firmware or the firmware update for the electronic key.

During steps E11 and E40, the mobile terminal sets up communication with the terminals to be updated; for this purpose, and where necessary, it opens the radio communication channel in ad hoc WiFi mode or in Bluetooth mode. In infrastructure mode (IF), this step is not necessary since the terminals are already connected to the local network (e.g. the mobile terminal connects to the extension key in infrastructure mode but it connects to the STB using Bluetooth).

During an optional step E12, the mobile terminal requests the version number from the electronic key, which it recovers during a step E13.

During a step E14, it analyses the version number and "pushes" the firmware update (UC2_FIRM) for the key if the key is not up to date, in the form of a sub-component program, etc.) or an update (a file, a program "patch", etc.).

During a step E43, the extension key recovers the new firmware C2_FIRM (or its update UC2_FIRM) and it optionally reinitializes the extension key in order to update the firmware or replace it during a step E44.

During a step E45, the extension key optionally acknowledges updating the new version. During an optional step E16 (E46), the mobile terminal closes the session (e.g. the ad hoc WiFi session).

Naturally, the above-described embodiments are given in purely indicative and non-limiting manner and numerous modifications may easily be made by the person skilled in the art without thereby going beyond the ambit of the invention.

The invention claimed is:

1. A method comprising:
controlling an updating of a co-operative service in a local network by a mobile terminal that is connected to the local network through a local network gateway and to a mobile network, said co-operative service being distributed into a plurality of software components that run on a plurality of different terminals of the local network and connected to the local network gateway, said software components executing the service when they run in cooperation, wherein a software component of said software components is located on the mobile terminal, and wherein controlling the updating comprises acts of:
downloading on the mobile terminal an update of the service from the mobile network, said downloading being independent from any request coming from the local network, and wherein the update comprises at least two update components, each update component being an update for a respective one of the plurality of software components;
updating the software component of the mobile terminal; and
distributing at least one update component contained in the update of the service over the local network to at least one terminal of the local network that is different from the mobile terminal, on which the respective software component runs.

2. The method according to claim 1, wherein the update of the service includes a sub-component for controlling the updating of the service.

3. The method according to claim 1, further comprising:
acquiring at least information associated with a version of the software component on a particular one of different terminals of the local network;
analyzing at least the acquired information associated with the version of the software component; and
depending on the results of the analysis, deciding whether or not to update the software component on the particular terminal.

4. The method according to claim 1, wherein communication between the mobile terminal and at least one of the different terminals to which one of the update components is distributed is set up over a low power consumption link.

5. The method according to claim 1, wherein the mobile terminal is one of the plurality of different terminals of the local network and to which at least one of the update components is distributed.

6. A mobile terminal for controlling an updating of a co-operative service in a local network, said co-operative service being distributed into a plurality of software components that run on a plurality of different terminals on the local network that are connected to a local network gateway, said software components executing the service when they run in cooperation, wherein a software component of said software components is located on the mobile terminal, and wherein the mobile terminal comprises:
a receive module on a mobile terminal, which connects to a mobile network and downloads an update of the service from the mobile network, said download being independent from any request coming from the local network, and wherein the update comprises at least two update components, each update component being an update for a respective one of the plurality of software components;
updating the software component of the mobile terminal;
a distribution module on the mobile terminal, which distributes at least one update component contained in the update of the service over the local network to at least one terminal of the local network that is different from the mobile terminal, on which the respective software component runs, wherein the mobile terminal connects to the local network through the local network gateway; and a processor, which is connected to the receive and transmit modules and is configured by code instructions to control the updating.

7. The mobile terminal including the device according to claim 6 for controlling updating.

8. A method comprising:

updating a co-operative service in a local network by a receiver terminal that is connected to the local network through a local network gateway, said co-operative service being distributed into a plurality of software components that run on a plurality of different terminals of the local network that are connected to the local network gateway, including the receiver terminal, said software components executing the service when they run in cooperation, wherein the updating comprises acts of:

the receiver terminal receiving a respective update component from a mobile terminal, which is connected to the local network and to a mobile network, a software component of said software components being located on the mobile terminal, the mobile terminal being different from the receiver terminal and distributing at least at least one update component, including the respective update component, contained in an update of the cooperative service to the receiver terminal of the local network on which the respective software component runs, said receiving being independent from any request sent by the receiver terminal; and the receiver terminal updating the respective software component.

9. A receiver terminal for updating a co-operative service in a local network to which the receiver terminal is connected through a local network gateway, said co-operative service being distributed into a plurality of software components that run on a plurality of different terminals of the local network, including the receiver terminal, that are connected to the local network gateway, said software components executing the service when they run in cooperation, wherein the receiver terminal comprises:

a receive module on the receiver terminal, which is configured to receive a respective update component from a mobile terminal over a communication with the mobile terminal set up via the local network, a software component of said software components being located on the mobile terminal, the mobile terminal being different from the receiver terminal, being connected to the local network and to a mobile network and distributing at least one update component, including the respective update component, contained in an update of the cooperative service to the receiver terminal of the local network on which the respective software component runs, the respective update component being received by the receiver terminal independently from any request sent by the receiver terminal;

an updating module on the receiver terminal, which updates the respective software component; and a processor, which is connected to the receive and updating modules and is configured by code instructions to control the updating.

10. An electronic key including the receiver terminal according to claim 9.

11. The receiver terminal according to claim 9, wherein the receiver terminal is a home terminal that is not connectable to a wide area network.

* * * * *